(12) United States Patent
Lainema

(10) Patent No.: US 12,273,565 B2
(45) Date of Patent: Apr. 8, 2025

(54) APPARATUS, A METHOD AND A COMPUTER PROGRAM FOR VIDEO CODING AND DECODING

(71) Applicant: Nokia Technologies Oy, Espoo (FI)

(72) Inventor: Jani Lainema, Tampere (FI)

(*) Notice: Subject to any disclaimer, the term of this patent is extended or adjusted under 35 U.S.C. 154(b) by 97 days.

(21) Appl. No.: 17/635,133

(22) PCT Filed: Sep. 9, 2020

(86) PCT No.: PCT/EP2020/075191
§ 371 (c)(1),
(2) Date: Feb. 14, 2022

(87) PCT Pub. No.: WO2021/052832
PCT Pub. Date: Mar. 25, 2021

(65) Prior Publication Data
US 2022/0295104 A1    Sep. 15, 2022

Related U.S. Application Data

(60) Provisional application No. 62/903,116, filed on Sep. 20, 2019.

(51) Int. Cl.
*H04N 19/12*    (2014.01)
*H04N 19/176*    (2014.01)
(Continued)

(52) U.S. Cl.
CPC ............. *H04N 19/70* (2014.11); *H04N 19/12* (2014.11); *H04N 19/176* (2014.11);
(Continued)

(58) Field of Classification Search
None
See application file for complete search history.

(56) References Cited

U.S. PATENT DOCUMENTS

2008/0170613 A1   7/2008   Tian et al. ............... 375/240.03
2018/0103252 A1   4/2018   Hsieh et al. ..................... 19/122
(Continued)

FOREIGN PATENT DOCUMENTS

CN    1145553 A    3/1997
CN    1764278 A    4/2006
(Continued)

OTHER PUBLICATIONS

Chiang et al., "CE6-related: Constraint and simplification for LFNST signalling", Joint Video Experts Team (JVET) of ItuTU-T SG 16 WP 3 and ISO/IEC JTC 1/SC 29/WG 11, JVET-O0291-v2, 15th Meeting, Jul. 3-12, 2019, pp. 1-4.
(Continued)

*Primary Examiner* — Samuel D Fereja

(57) ABSTRACT

There is disclosed a method comprising obtaining a block of transform coefficients; searching a position of a last non-zero coefficient in a scan order in the block; selecting a secondary transform mode based on the position and encoding first syntax elements indicative of the selected secondary transform mode. A primary transform mode is selected based on the secondary transform mode. Second syntax elements indicative of the selected primary transform mode and third syntax elements defining the transform coefficients within the block are encoded. There is also disclosed a method comprising receiving encoded information related to a block of transform coefficients; decoding an indication of a position of a last non-zero coefficient in a scan order in the block and using the position to determine if an indication of a secondary transform mode is present in the bit stream. If so, first syntax elements indicative of the secondary transform mode are decoded and used to determine if an indication of a primary transform mode is present in the bit stream. If so, second syntax elements indicative of the primary transform mode are decoded. The transform coefficients are (Continued)

decoded and the determined transform modes are applied to select transforms and the transforms, if any, are applied to the transform coefficients.

20 Claims, 9 Drawing Sheets

(51) Int. Cl.
    *H04N 19/18*       (2014.01)
    *H04N 19/184*    (2014.01)
    *H04N 19/60*       (2014.01)
    *H04N 19/70*       (2014.01)

(52) U.S. Cl.
    CPC ........... *H04N 19/18* (2014.11); *H04N 19/184* (2014.11); *H04N 19/60* (2014.11)

(56) References Cited

U.S. PATENT DOCUMENTS

| | | | |
|---|---|---|---|
| 2019/0007682 | A1 | 1/2019 | Kanoh et al. ............... 19/12 |
| 2019/0104322 | A1 | 4/2019 | Tsukuba |
| 2021/0076070 | A1* | 3/2021 | Jung ................ H04N 19/12 |
| 2021/0392327 | A1* | 12/2021 | Zhang ............... H04N 19/593 |
| 2022/0159300 | A1* | 5/2022 | Chiang ............... H04N 19/70 |
| 2022/0182675 | A1* | 6/2022 | Zhang ............... H04N 19/60 |
| 2023/0038161 | A1* | 2/2023 | Zhang ............... H04N 19/122 |

FOREIGN PATENT DOCUMENTS

| | | |
|---|---|---|
| CN | 106031177 A | 10/2016 |
| CN | 107918360 A | 4/2018 |
| CN | 108141596 A | 6/2018 |
| RU | 2682838 C1 | 3/2019 |
| WO | 2017/192705 A1 | 11/2017 |
| WO | 2018/123644 A1 | 7/2018 |
| WO | 2018/165397 A1 | 9/2018 |
| WO | WO-2018/231488 A1 | 12/2018 |

OTHER PUBLICATIONS

Chiang et al., "CE6-related: Latency reduction for LFNST signalling", Joint Video Experts Team (JVET) of ITU-T SG 16 WP 3 and ISO/IEC JTC 1/SC 29/WG 11, JVET-O0293-v2, 15th Meeting, Jul. 3-12, 2019, pp. 1-7.
Bross et al., "Versatile Video Coding (Draft 6)", Joint Video Experts Team (JVET) of ITU-T SG 16 WP 3 and ISO/IEC JTC 1/SC 29/WG 11, JVET-O2001-vE, 15th Meeting, Jul. 3-12, 2019, 455 pages.
Bross et al., "Versatile Video Coding (Draft 5)", Joint Video Experts Team (JVET) of ITU-T SG 16 WP 3 and ISO/IEC JTC 1/SC 29/WG 11, JVET-N1001-v10, 14th Meeting, Mar. 19-27, 2019, 406 pages.
Office action received for corresponding Canadian Patent Application No. 3151584, dated Apr. 12, 2023, 3 pages.
Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, 7th Meeting, Jul. 13-21, 2017, 50 pages.
"IEEE 802.11", Wikipedia, Retrieved on Feb. 13, 2022, Webpage available at : https://en.wikipedia.org/wiki/IEEE_802.11.
"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.
"Information Technology—Coding Of Audio-Visual Objects—Part 12: ISO Base Media File Format", ISO/IEC 14496-12, Fifth edition, Dec. 15, 2015, 248 pages.
"Information Technology—Coding Of Audio-Visual Objects—Part 15: Advanced Video Coding (AVC) File Format", ISO/IEC 14496-15, First edition, Apr. 15, 2004, 29 pages.
"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.
"Advanced Video Coding For Generic Audiovisual services", Series H: Audiovisual And Multimedia Systems, Infrastructure of audiovisual services—Coding of moving Video, Recommendation ITU-T H.264, Apr. 2017, 812 pages.
"High Efficiency Video Coding", Series H: Audiovisual And Multimedia Systems, Infrastructure of audiovisual services—Coding of moving video, Recommendation ITU-T H.265, Feb. 2018, 692 pages.
"Versatile Video Coding", Series H: Audiovisual and Multimedia Systems Infrastructure of audiovisual services—Coding of moving video, Recommendation ITU-T H.266, Aug. 2020, 516 pages.
"Parameter Values for Ultra-High Definition Television Systems for Production And International Programme Exchange", Recommendation ITU-R BT.2020, Aug. 2012, 7 pages.
"Parameter Values for the HDTV Standards for Production and International Programme Exchange", Recommendation ITU-R BT.709-6, Jun. 2015, 19 pages.
International Search Report and Written Opinion received for corresponding Patent Cooperation Treaty Application No. PCT/EP2020/075191, dated Oct. 12, 2020, 14 pages.
Jung et al., "Non-CE6: Simplified LFNST signalling", Joint Video Experts Team (JVET) of ITU-T SG 16 WP 3 and ISO/IEC JTC 1/SC 29/WG 11, JVET-O0458-v1, 15th Meeting, Jul. 3-12, 2019, 4 pages.
Lainema, "CE6-related: Simplified LFNST", Joint Video Experts Team (JVET) of ITU-T SG 16 WP 3 and ISO/IEC JTC 1/SC 29/WG 11, JVET-O0349, 15th Meeting, Jul. 3-12, 2019, 5 pages.
Koo et al., "CE6: Reduced Secondary Transform (RST) (CE6-3.1)", Joint Video Experts Team (JVET) of ITU-T SG 16 WP 3 and ISO/IEC JTC 1/SC 29/WG 11, JVET-N0193, 14th Meeting, Mar. 19-27, 2019, pp. 1-16.
Lainema, "CE6-related: Latency reduction for LFNST signalling", Joint Video Experts Team (JVET) of ITU-T SG 16 WP 3 and ISO/IEC JTC 1/SC 29/WG 11, JVET-P0196-v3, 16th Meeting, Oct. 1-11, 2019, 4 pages.
Office action received for corresponding Indian Patent Application No. 202247021526, dated Aug. 8, 2022, 6 pages.
Office action received for corresponding Vietnamese Patent Application No. 1-2022-01598, dated Jun. 2, 2022, 1 page of office action and 1 page of translation available.
Office action received for corresponding Russian Patent Application No. 2022106711, dated Dec. 1, 2022, 5 pages of office action and no page of translation available.
Koo, Moonmo et al., "Non-CE6 : LFNST simplification based on the methods proposed in CE6-2.1a", Joint Video Experts Team (JVET) of ITU-T SG 16 WP 3 and ISO/IEC JTC 1/SC 29/WG 11, JVET-O0209, Jul. 2019, 15 pages.
Le Leannec, F., et al., « Non-CE6 : interaction between MTS and LFNST », Joint Video Experts Team (JVET) of ITU-T SG 16 WP3 and ISO/IEC JTC 1/SC 29/WG11, JVET-O0466, Jul. 2019.
Song, Shichang, "Master Thesis submitted to University of Electronic Science and Technology of China, Research on Inter Prediction and Transform Coding in Next Generation Video Coding Standard", China Academic Journal Electronic Publishing House, Sep. 15, 2018, 80 pages.

* cited by examiner

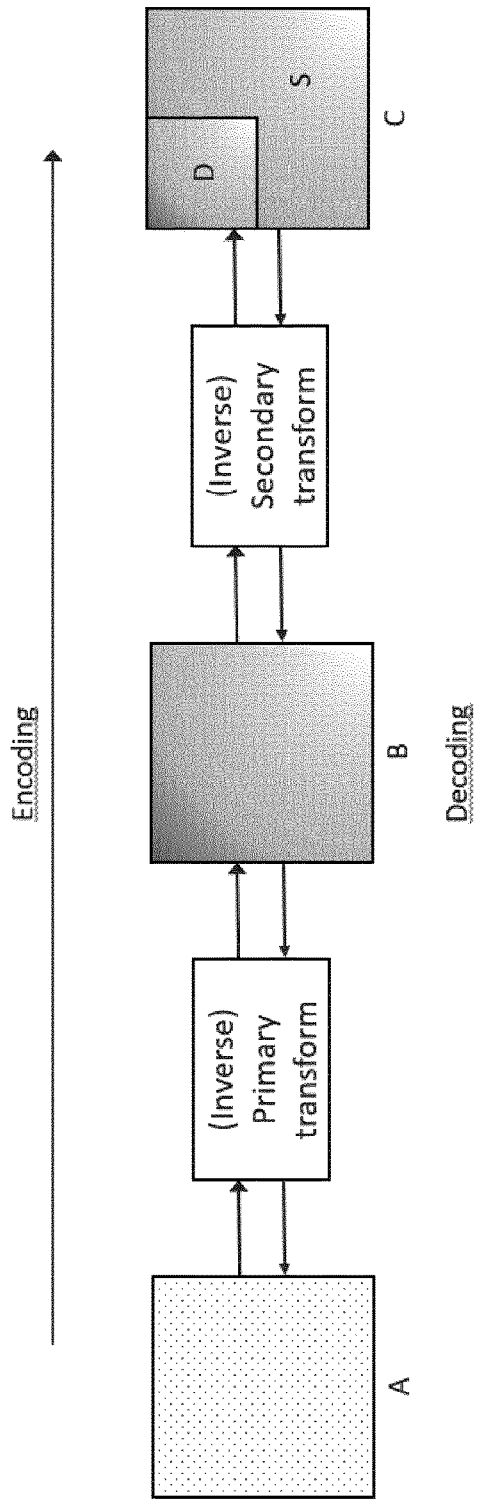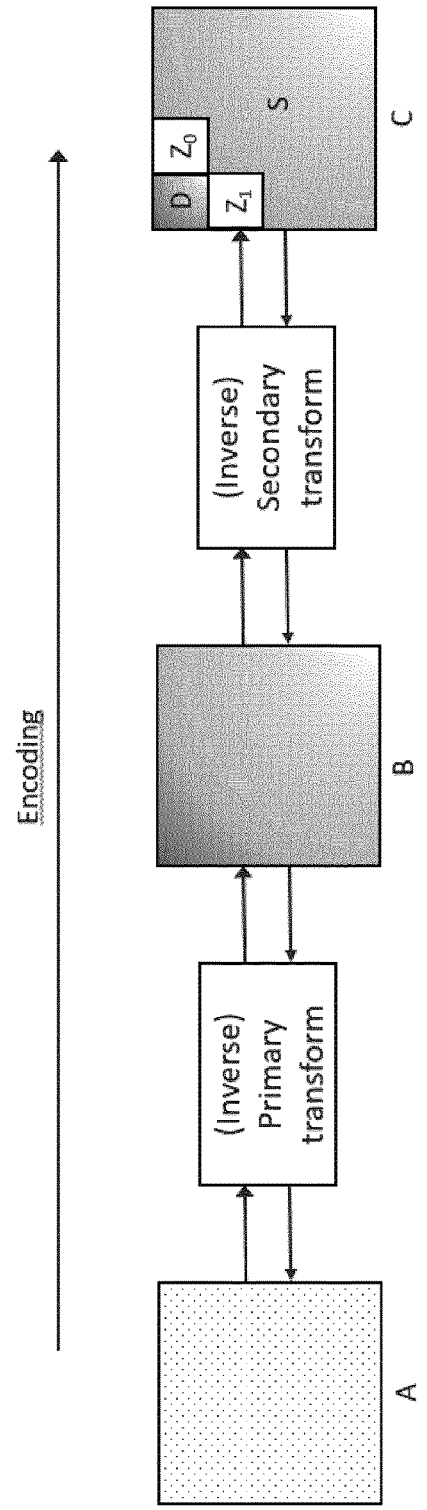
Fig. 6
Fig. 7

APPARATUS, A METHOD AND A COMPUTER PROGRAM FOR VIDEO CODING AND DECODING

RELATED APPLICATION

This application claims priority to PCT Application No. PCT/EP2020/075191, filed on Sep. 9, 2020, which claims priority to U.S. application Ser. No. 62/903,116, filed on Sep. 20, 2019, each of which is incorporated herein by reference in its entirety.

TECHNICAL FIELD

The present invention relates to an apparatus, a method and a computer program for video coding and decoding.

BACKGROUND

In video coding, still pictures and pictures in a video sequence are typically split into smaller blocks of samples in order to compress those to a desired file size, bitrate or a target quality level. Each of the blocks are then predicted either by spatial or temporal means and remaining error between the prediction block and the corresponding block in the original image is coded with residual coding means. For encoding and decoding, an image is typically split into coding units which define the common segmentation for prediction and residual coding. Coding units can further be divided into one or more prediction units containing the sample prediction related information for a full coding unit or different parts of a coding unit. Similarly, a coding unit can be divided into one or more transform units or transform blocks that contain the residual (or transform) coding related information for a certain area or a component of the coding unit.

Residual coding means typically include transforming a residual block into frequency domain, quantization of the resulting transform coefficients and entropy coding the quantized coefficients. As a primary transform, for example DCT (Discrete Cosine Transform), or its derivatives can be used.

Also so-called secondary transforms can be applied to improve the coding efficiency further. A secondary transform typically takes part of the output of the primary transform (e.g. DCT) and performs additional transformation to the low frequency coefficients of the primary transform. In this case the final set of transform coefficients consists of low frequency coefficients that have been double transformed and high frequency coefficients that have been transformed with a single transform. In some implementations the high frequency coefficients may be omitted and only the double transformed coefficients may be signaled when secondary transform is activated for a transform block. As a secondary transform, for example LFNST (Low-Frequency Non-Separable Transform) or its derivatives may be used.

Selection and signaling of the primary transform typically takes place per transform unit or transform block, while selection and signaling of a secondary transform typically takes place for a full coding unit. Availability of a secondary transform for a coding unit is also typically made dependent on transform coefficients within the whole coding unit reaching some level of frequency to avoid typically unnecessary secondary transform signaling for low activity coding units. Such approaches impose restrictions and dependencies between different transform blocks in a coding unit and may lead to increased encoder and decoder side latencies, as well as sub-optimal coding efficiency.

SUMMARY

Now in order to at least alleviate the above problems, enhanced methods for indicating and determining transform modes in encoders and decoders are introduced herein.

There is provided a transform signaling mechanism where the signaling of primary transform may be performed based on the use of a secondary transform. The signaling may be made after the last transform coefficient position is signaled in a transform block and before the signaling of coefficients in that transform block. This setting may allow a video decoder to determine both the type of primary transform and the type of secondary transform before decoding coefficients in a transform block and skip decoding coefficient areas that are not applicable for the selected primary transform or the selected primary-secondary transform pair.

An apparatus according to a first aspect comprises at least one processor and at least one memory, said at least one memory stored with code thereon, which when executed by said at least one processor, causes the apparatus to perform at least:
 obtain a block of transform coefficients;
 search a position of a last non-zero coefficient in a scan order in the block of transform coefficients;
 select a secondary transform mode based on the position of the last non-zero coefficient and encode first syntax elements indicative of the selected secondary transform mode;
 select a primary transform mode based on the selected secondary transform mode and encode second syntax elements indicative of the selected primary transform mode; and
 encode third syntax elements defining the transform coefficients within the block.

A method according to a second aspect comprises:
 obtaining a block of transform coefficients;
 searching a position of a last non-zero coefficient in a scan order in the block of transform coefficients;
 selecting a secondary transform mode based on the position of the last non-zero coefficient and encoding first syntax elements indicative of the selected secondary transform mode;
 selecting a primary transform mode based on the selected secondary transform mode and encoding second syntax elements indicative of the selected primary transform mode; and
 encoding third syntax elements defining the transform coefficients within the block.

An apparatus according to a third aspect comprises at least one processor and at least one memory, said at least one memory stored with code thereon, which when executed by said at least one processor, causes an apparatus to perform at least
 receive a bit stream comprising encoded information related to a block of transform coefficients;
 decode from the bit stream an indication of a position of a last non-zero coefficient in a scan order in the block of transform coefficients;
 use the position of the last coefficient to determine if an indication of a secondary transform mode is present in the bit stream;
 if an indication of a secondary transform mode is present in the bit stream, determine the secondary transform mode by decoding first syntax elements indicative of the secondary transform mode;
use the determined secondary transform mode to determine if an indication of a primary transform mode is present in the bit stream;
if an indication of a primary transform mode is present in the bit stream, determine the primary transform mode by decoding second syntax elements indicative of the primary transform mode;
decode the transform coefficients; and
apply the determined transform modes to select transforms and apply the transforms, if any, to the transform coefficients.

A method according to a fourth aspect comprises:
receiving a bit stream comprising encoded information related to a block of transform coefficients;
decoding from the bit stream an indication of a position of a last non-zero coefficient in a scan order in the block of transform coefficients;
using the result of the search to determine whether coefficients of the block encoded in the bit stream have been transformed by a secondary transform and if so, determining the secondary transform mode;
searching from the bit stream an indication of a primary transform mode;
using the position of the last coefficient to determine if an indication of a secondary transform mode is present in the bit stream;
if an indication of a secondary transform mode is present in the bit stream, determining the secondary transform mode by decoding first syntax elements indicative of the secondary transform mode;
using the determined secondary transform mode to determine if an indication of a primary transform mode is present in the bit stream;
if an indication of a primary transform mode is present in the bit stream, determining the primary transform mode by decoding second syntax elements indicative of the primary transform mode;
decoding the transform coefficients; and
applying the determined transform modes to select transforms and apply the transforms, if any, to the transform coefficients.

An apparatus according to a fifth aspect comprises means for:
obtaining a block of transform coefficients;
searching a position of a last non-zero coefficient in a scan order in the block of transform coefficients;
selecting a secondary transform mode based on the position of the last non-zero coefficient and encoding first syntax elements indicative of the selected secondary transform mode;
selecting a primary transform mode based on the selected secondary transform mode and encoding second syntax elements indicative of the selected primary transform mode; and
encoding third syntax elements defining the transform coefficients within the block. An apparatus according to a sixth aspect comprises means for:
receiving a bit stream comprising encoded information related to a block of transform coefficients;
decoding from the bit stream an indication of a position of a last non-zero coefficient in a scan order in the block of transform coefficients;
using the position of the last coefficient to determine if an indication of a secondary transform mode is present in the bit stream;

if an indication of a secondary transform mode is present in the bit stream, determining the secondary transform mode by decoding first syntax elements indicative of the secondary transform mode;
using the determined secondary transform mode to determine if an indication of a primary transform mode is present in the bit stream;
if an indication of a primary transform mode is present in the bit stream, determining the primary transform mode by decoding second syntax elements indicative of the primary transform mode;
decoding the transform coefficients; and
1applying the determined transform modes to select transforms and apply the transforms, if any, to the transform coefficients.

A computer readable storage medium according to a seventh aspect comprises code for use by an apparatus, which when executed by a processor, causes the apparatus to perform:
obtain a block of transform coefficients;
search a position of a last non-zero coefficient in a scan order in the block of transform coefficients;
select a secondary transform mode based on the position of the last non-zero coefficient and encode first syntax elements indicative of the selected secondary transform mode;
select a primary transform mode based on the selected secondary transform mode and encode second syntax elements indicative of the selected primary transform mode; and
encode third syntax elements defining the transform coefficients within the block.

A computer readable storage medium according to an eighth aspect comprises code for use by an apparatus, which when executed by a processor, causes the apparatus to perform:
receive a bit stream comprising encoded information related to a block of transform coefficients;
decode from the bit stream an indication of a position of a last non-zero coefficient in a scan order in the block of transform coefficients;
use the position of the last coefficient to determine if an indication of a secondary transform mode is present in the bit stream;
if an indication of a secondary transform mode is present in the bit stream, determine the secondary transform mode by decoding first syntax elements indicative of the secondary transform mode;
use the determined secondary transform mode to determine if an indication of a primary transform mode is present in the bit stream;
if an indication of a primary transform mode is present in the bit stream, determine the primary transform mode by decoding second syntax elements indicative of the primary transform mode;
decode the transform coefficients; and
apply the determined transform modes to select transforms and apply the transforms, if any, to the transform coefficients.

A method according to a ninth aspect comprises:
receiving a bit stream comprising encoded information related to a block of transform coefficients;
determining if the block of transform coefficients is the first block of transform coefficients in a coding unit;

in response to the block of transform coefficients being the first block of transform coefficients in the coding unit, decoding a secondary transform mode from the bit stream;

apply the determined secondary transform mode to select transforms for all blocks of transform coefficients in the coding unit.

A method according to a tenth aspect comprises:

receiving a bit stream comprising encoded information related to a block of transform coefficients;

determining if the block of transform coefficients is the first block with one or more non-zero transform coefficients in a coding unit;

in response to the block of transform coefficients being the first block with one or more non-zero transform coefficients in the coding unit, decoding a secondary transform mode from the bit stream;

apply the determined secondary transform mode to select transforms for all blocks with one or more non-zero transform coefficients in the coding unit.

The apparatuses and the computer readable storage mediums stored with code thereon, as described above, are thus arranged to carry out the above methods and one or more of the embodiments related thereto.

BRIEF DESCRIPTION OF THE DRAWINGS

For better understanding of the present invention, reference will now be made by way of example to the accompanying drawings in which:

FIG. 6 illustrates the dual transform process both in encoding and decoding direction;

FIG. 7 shows a dual transformation process with an incomplete or a partial secondary transform;

DETAILED DESCRIPTON OF SOME EXAMPLE EMBODIMENTS

Figure 2:
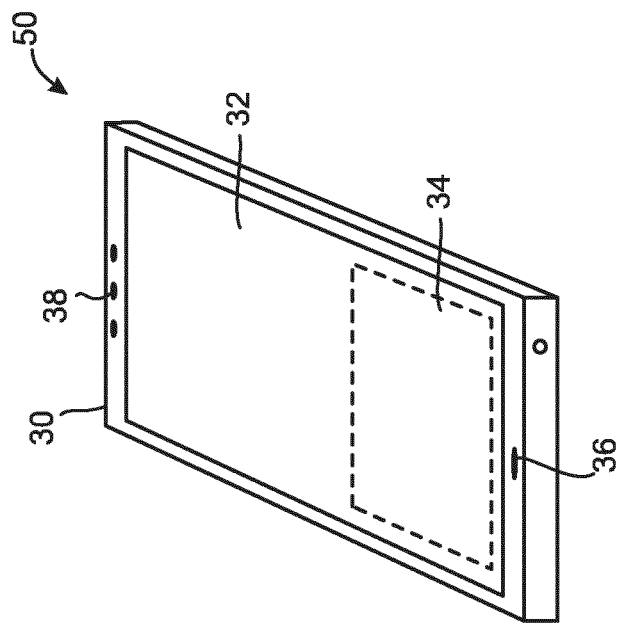
FIG. 2 shows schematically a user equipment suitable for employing embodiments of the invention.
Figure 1:
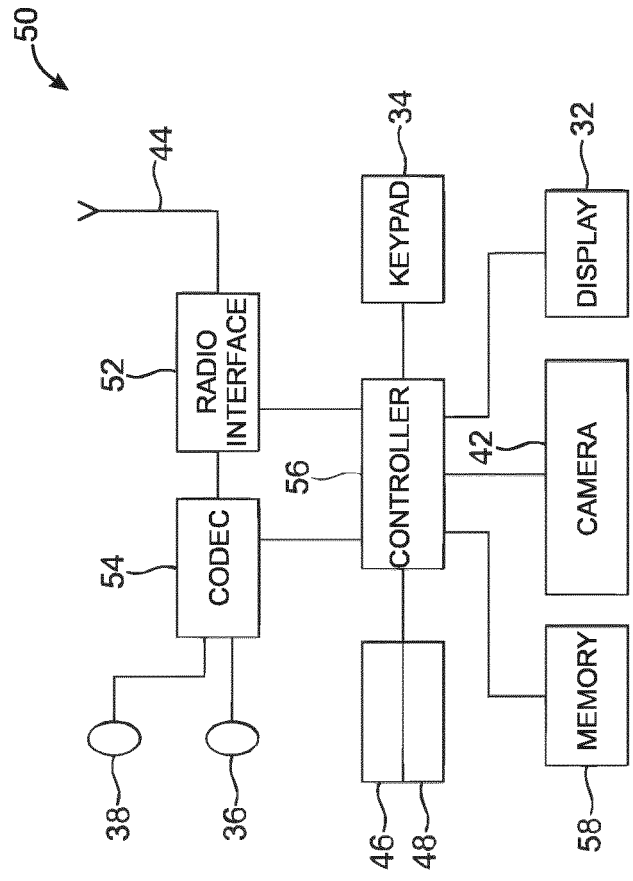
FIG. 1 shows schematically an electronic device employing embodiments of the invention.

The following describes in further detail suitable apparatus and possible mechanisms for dual transformation and an inverse dual transformation. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
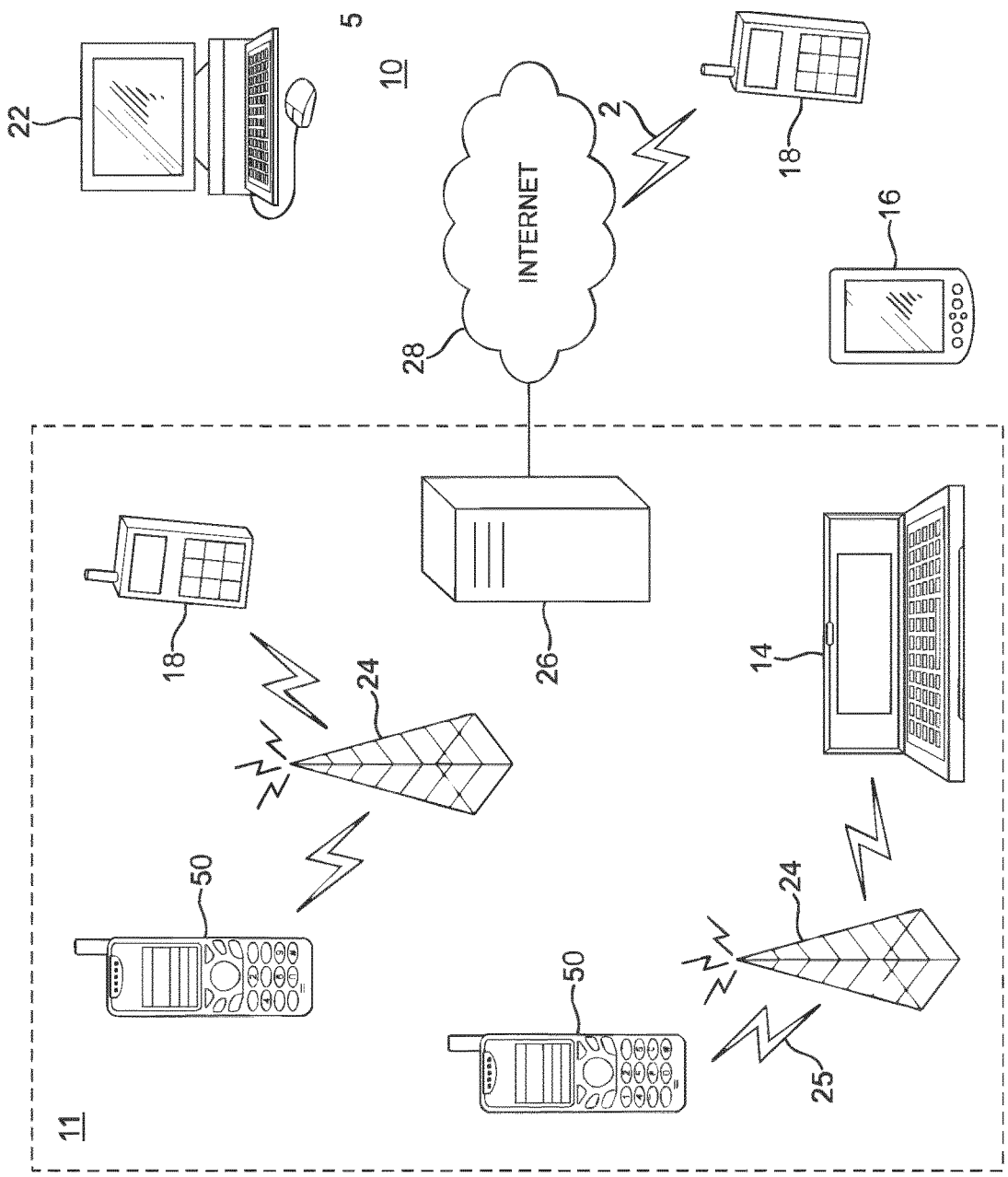
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Motion compensation can be performed either with full sample or sub-sample accuracy. In the case of full sample accurate motion compensation, motion can be represented as a motion vector with integer values for horizontal and vertical displacement and the motion compensation process effectively copies samples from the reference picture using those displacements. In the case of sub-sample accurate motion compensation, motion vectors are represented by fractional or decimal values for the horizontal and vertical components of the motion vector. In the case a motion vector is referring to a non-integer position in the reference picture, a sub-sample interpolation process is typically invoked to calculate predicted sample values based on the reference samples and the selected sub-sample position. The sub-sample interpolation process typically consists of horizontal filtering compensating for horizontal offsets with respect to full sample positions followed by vertical filtering compensating for vertical offsets with respect to full sample positions. However, the vertical processing can be also be done before horizontal processing in some environments.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
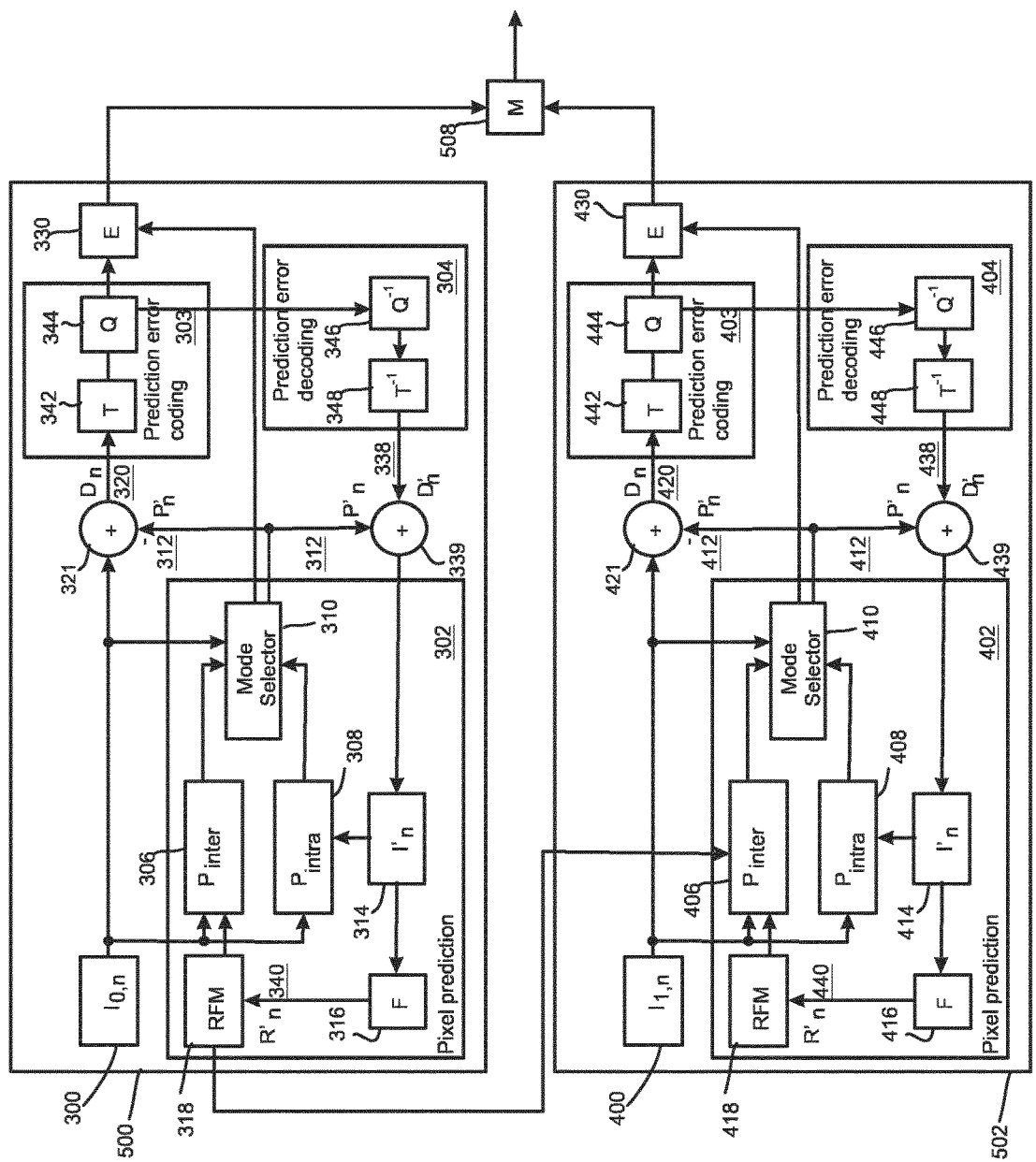
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block (s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

Versatile Video Coding (VVC) (MPEG-I Part 3), a.k.a. ITU-T H.266, is a video compression standard being developed by the Joint Video Experts Team (JVET) of the Moving Picture Experts Group (MPEG), (formally ISO/IEC JTC1 SC29 WG11) and Video Coding Experts Group (VCEG) of the International Telecommunication Union (ITU) to be the successor to HEVC/H.265.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tristimulus color samplings (for example, YZX, also known as XYZ).

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can further be split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/ decoded picture. The reference index is typically predicted from adjacent blocks and/or co-located blocks in temporal reference picture. Moreover, typical high efficiency video codecs employ an additional motion information coding/ decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor A to tie together the (exact or estimated) image distortion due to lossy coding methods and the (exact or estimated) amount of information that is required to represent the pixel values in an image area:

$$C = D + \lambda R, \qquad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/ AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively.

A SEI NAL unit may contain one or more SEI messages, which are not required for the decoding of output pictures but may assist in related processes, such as picture output timing, rendering, error detection, error concealment, and resource reservation.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion parameter types or motion information may include but are not limited to one or more of the following types:
an indication of a prediction type (e.g. intra prediction, uni-prediction, bi-prediction) and/or a number of reference pictures;
an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
an indication of a reference picture type, such as a short-term reference picture and/or a long-term reference picture and/or an inter-layer reference picture (which may be indicated e.g. per reference picture)
a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
a horizontal motion vector component (which may be indicated e.g. per prediction block or per reference index or alike);
a vertical motion vector component (which may be indicated e.g. per prediction block or per reference index or alike);
one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
coordinates of a block to which the motion parameters and/or motion information applies, e.g. coordinates of the top-left sample of the block in luma sample units;
extents (e.g. a width and a height) of a block to which the motion parameters and/or motion information applies.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:
Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.
Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

Bit-depth scalability: Base layer pictures are coded at lower bit-depth (e.g. 8 bits) than enhancement layer pictures (e.g. 10 or 12 bits).

Dynamic range scalability: Scalable layers represent a different dynamic range and/or images obtained using a different tone mapping function and/or a different optical transfer function.

Chroma format scalability: Base layer pictures provide lower spatial resolution in chroma sample arrays (e.g. coded in 4:2:0 chroma format) than enhancement layer pictures (e.g. 4:4:4 format).

Color gamut scalability: enhancement layer pictures have a richer/broader color representation range than that of the base layer pictures—for example the enhancement layer may have UHDTV (ITU-R BT.2020) color gamut and the base layer may have the ITU-R BT.709 color gamut.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

It should be understood that many of the scalability types may be combined and applied together. For example color gamut scalability and bit-depth scalability may be combined.

The term layer may be used in context of any type of scalability, including view scalability and depth enhancements. An enhancement layer may refer to any type of an enhancement, such as SNR, spatial, multiview, depth, bit-depth, chroma format, and/or color gamut enhancement. A base layer may refer to any type of a base video sequence, such as a base view, a base layer for SNR/spatial scalability, or a texture base view for depth-enhanced video coding.

As described above, still pictures and pictures in a video sequence are typically split into smaller blocks of samples, which are predicted either by spatial or temporal means and remaining error between the prediction block and the corresponding block in the original image is coded with residual coding means. Residual coding means typically include transforming a residual block into frequency domain (using e.g. DCT (Discrete Cosine Transform) or its derivatives as the primary transform), quantization of the resulting transform coefficients and entropy coding the quantized coefficients.

Figure 5:
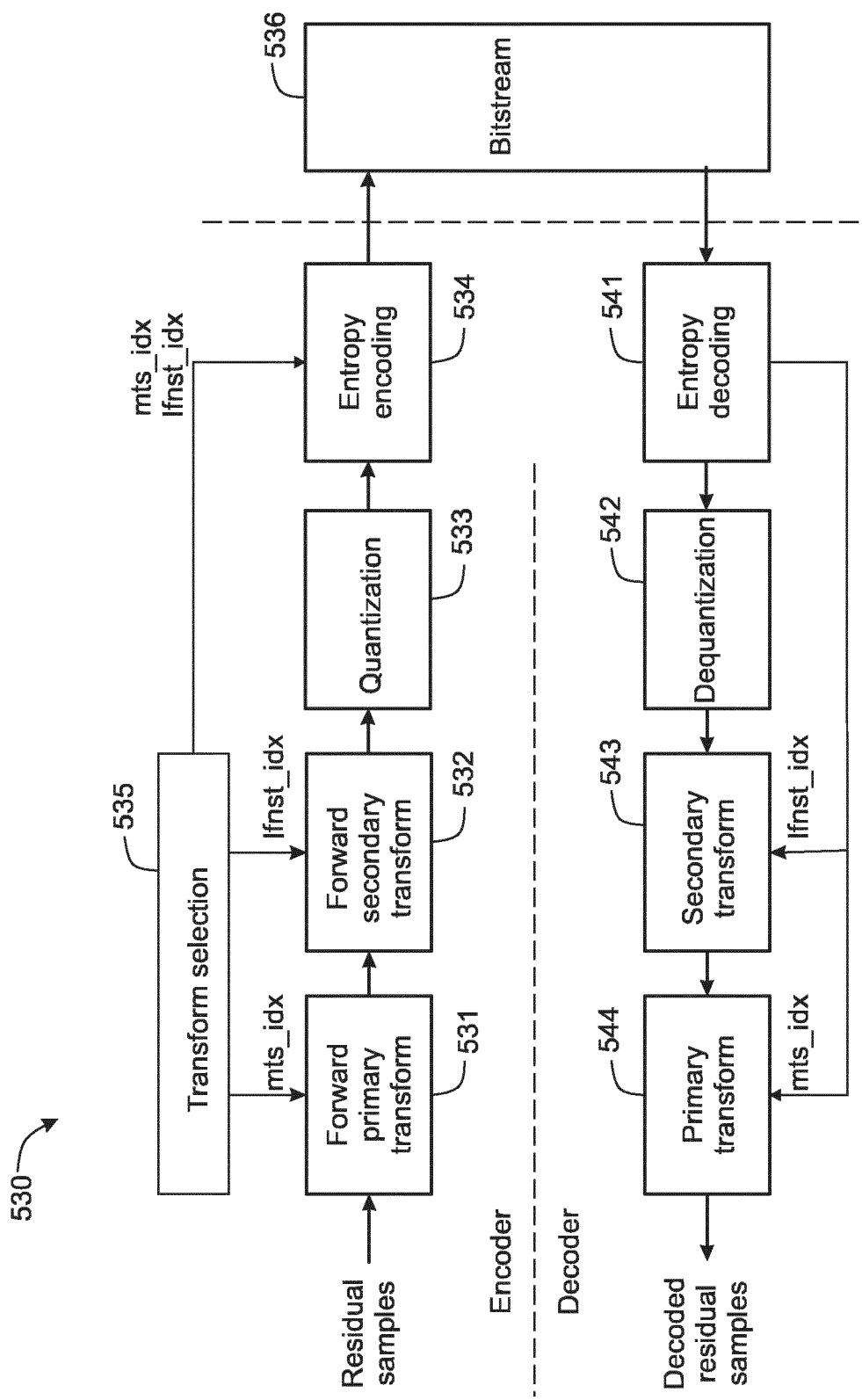
FIG. 5 illustrates an example of an encoder and decoder structure that can be used to encode and decode video and images using primary and secondary transforms, in accordance with an embodiment.

Also so-called secondary transforms can be applied to improve the coding efficiency further. A secondary transform typically takes part of the output of the primary transform (e.g. DCT) and performs additional transformation to the low frequency coefficients of the primary transform. FIG. 5 illustrates an example of an encoder 530 and decoder 540 structure that can be used to encode and decode video and images using primary and secondary transforms. The encoder 530 may implement logic to select the desired transform modes mts_idx for the primary transform and lfnst_idx for the secondary transform. These modes are encoded in the bitstream. The decoder 540 can then decode the same transform modes from the bitstream representation and apply the selected secondary and primary transforms to the decoded transform coefficients. The secondary transform mode lfnst_idx equal to zero may represent bypassing the secondary transform and only performing a primary transform to the transform coefficients. The primary transform can also be bypassed in a video codec. That can be indicated either by sending a separate flag for enabling such a transform skip mode, or that indication could be embedded in the signaling of the primary transform index mts_idx using one of its values as indication of the transform bypass mode.

Referring back to FIG. 4, the transform units 342, 442 therein may be considered to include the primary 531 and the secondary transform unit 532 of the dual transform encoder 530 of FIG. 5. Similarly, the inverse transformation units 362, 462 in FIG. 4 may be considered to include the inverse secondary transform unit 543 and the inverse primary transform unit 544 of the dual transform decoder 540 of FIG. 5.

Input to the dual transform encoder 530 typically consists of residual sample values defining a difference between predicted and original sample values in a video or image encoder. These values go through two transformation processes referred to as a primary transform 531 and a secondary transform 532. The resulting transform coefficients may be quantized 533 to a desired accuracy, entropy encoded 534 and output to a bitstream 536 or a file. A dual transform decoder 540 typically reads encoded symbols from a bitstream, entropy decodes 541 and dequantizes 542 those to transform coefficients and performs inverse of the secondary transform 543 and inverse of the primary transform 544. A primary transform can be for example a 2-dimensional DCT or DST and the secondary transform can be for example a non-separable 2-dimensional transform.

A transform selector 535 may perform a primary transform mode selection and a secondary transform mode selection and prepare indications of the selected transform modes for signaling to a decoder. The operation of the transform selector 535 according to several embodiments will be described later in this specification.

Now improved methods for a dual transformation and an inverse dual transformation process are introduced.

Figures 8, 9:
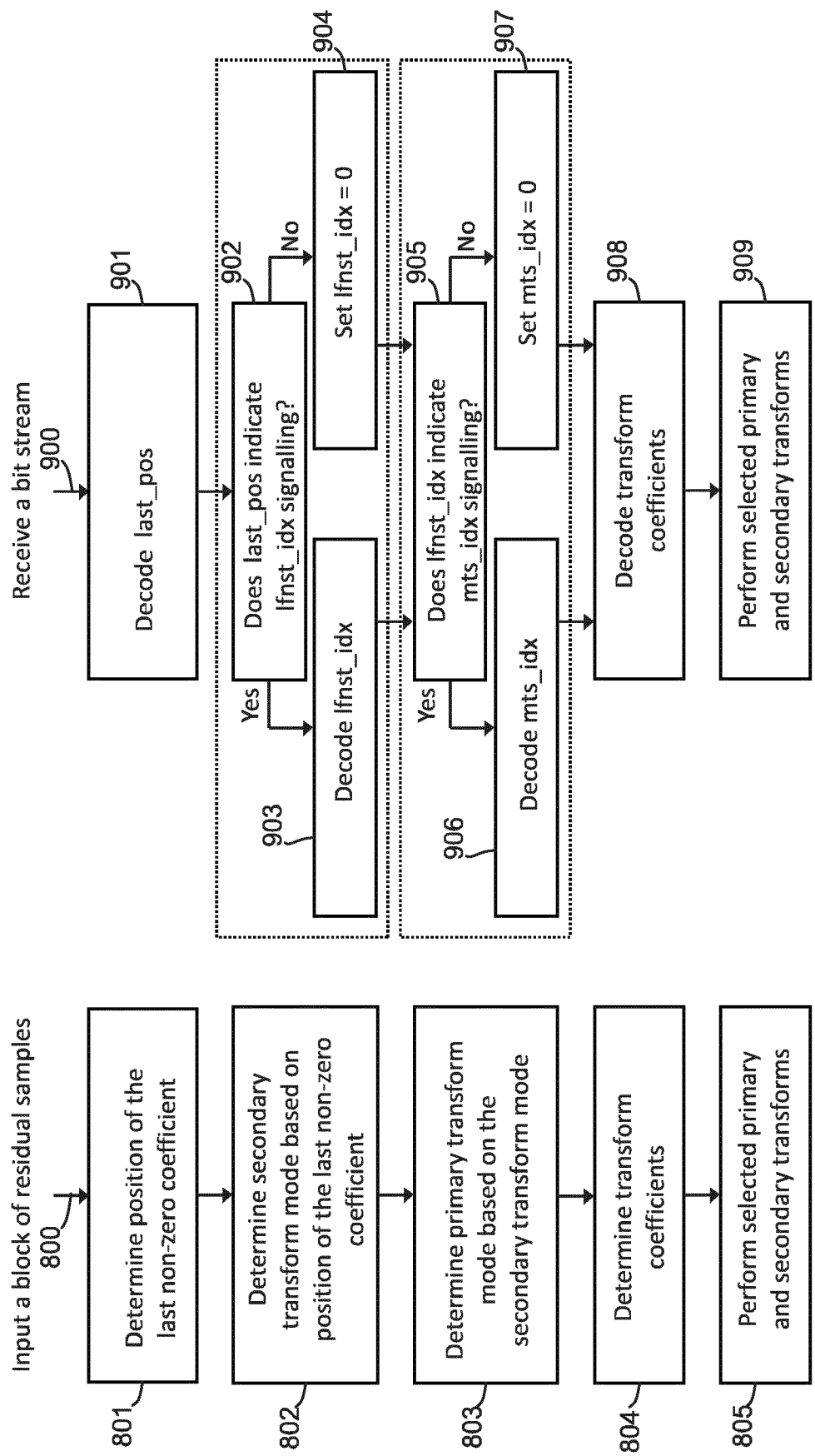
FIG. 8 shows a flow chart of an encoding method according to an embodiment of the invention.
FIG. 9 shows a flow chart of a decoding method according to an embodiment of the invention.

FIG. 8 illustrates an example of operation of an encoder 530 according to an embodiment. The encoding method comprises inputting (800) a block of residual samples; determining (801) a position of the last non-zero coefficient in a scan order; determining (802) a secondary transform mode based on the position of the last non-zero coefficient; determining (803) a primary transform mode based on the secondary transform mode; determining (804) transform coefficients; and performing (805) the primary and secondary transforms.

FIG. 9 illustrates an example of operation of a decoder 540 according to an embodiment. The decoding method comprises receiving (900) a bit stream and decoding (901) a last_pos syntax element to determine the last coefficient position within a transform block. The determined last coefficient position within the transform block is used to examine (902) whether the last position indicates that a lfnst_idx syntax element is signaled in the bitstream. If the last_pos is in a determined range, the lfnst_idx syntax element is decoded (903) and the secondary transform mode is determined based on the decoded lfnst_idx syntax element. If the last_pos is not in the determined range, the lfnst_idx syntax element is set (904) to zero or to another predetermined value indicating that the lfnst_idx syntax element is not signaled in the bit stream, and the secondary transform mode is determined not existing. The decoded (903) or set (904) value of the lfnst_idx syntax element is also examined (905) to determine whether the lfnst_idx syntax element indicates mts_idx signaling. If the examination reveals that the lfnst_idx syntax element indicates mts_idx signaling, the mts_idx syntax element is decoded (906) and the primary transform mode is determined based on the secondary transform mode. If lfnst_idx is not in the determined range, lfnst_idx is set (907) to 0 or to another predetermined value indicating that the primary transform mode is determined not existing. Transform coefficients are then decoded (908) and the selected (existing) primary and secondary transforms are performed (909).

In the following, some embodiments related to signaling primary and secondary transformation modes in connection with a video or image codec, encoder or decoder will be described in more detail.

Figure 10:
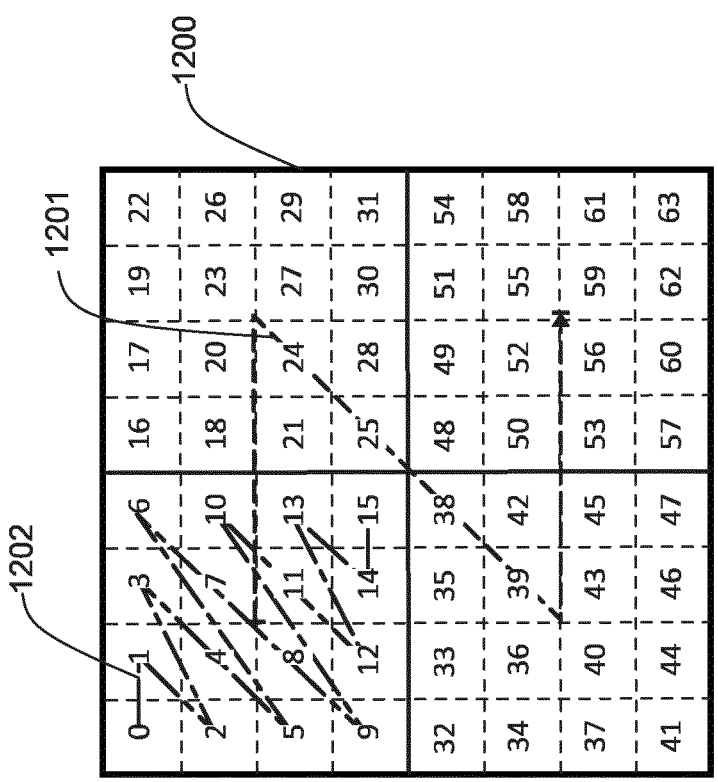
FIG. 10 illustrates an example of a transform block of size 8×8 and an exemplary scanning order.

An encoder 530 obtains a transform block comprising residual samples for processing. A transform selector 535 determine (searches) the position of the last coefficient in the transform block. Determining the position of the last transform coefficient can be done in an encoder by scanning the coefficients in a pre-determined order and checking what is the position of the last non-zero coefficient or another coefficient fulfilling a certain activity criterium in a transform block in that scan order. The determination may be performed, for example, so that sample values of the transform block are examined starting, for example, from the last coefficient in the transform block and if the sample value is zero, the sample value of the previous coefficient in a reversed scanning order is examined to determine whether it is zero or not. This is repeated until the first non-zero coefficient is found. The location of that coefficient in the transform block is used as an indication of the last non-zero coefficient. The location may be indicated e.g. as coordinates (row and column of the location of the last coefficient, or as an order number of the coefficient in a scanning order or in some other way. Different variants of diagonal scans may be used in image and video coding applications as combining those with signaling of the last non-zero coefficient in a block may efficiently represent typical coefficient distribution inside transform blocks where coefficients are often packed to the beginning of the scan and top-left corner of transform blocks. An example of such a scan is given in FIG. 10. In that example the scan is defined for an 8×8 block 1200 of transform coefficients based on 4×4 coefficient groups, where scan order of the groups is defined as diagonal from top-right to bottom-left and scan orders inside the coefficient groups are defined also to the same general direction. In this example the numbers in the transform block 1200 illustrate the order in which the samples are scanned, starting from 0 and proceeding to 63. In this example the scanning order follows the right-top to left-bottom diagonal scanning order of blocks, indicated with the arrow 1201. Within the blocks, similar scanning order may be followed, as can be seen from the example of FIG. 10 and indicated with the arrow 1202. In other words, first the coefficients in the top-left block are scanned in the right-top to left-bottom diagonal scanning order, next the coefficients in the top-right block are scanned in the right-top to left-bottom diagonal scanning order, followed by scanning coefficients of the bottom-left block, and finally, the bottom-right block. The above mentioned reversed scanning order is, as the name implies, reversed from the above described scanning order. Using the example of FIG. 10, the last coefficient is numbered as 63, the previous is numbered as 62, etc.

Instead of the non-zero value of a coefficient, the above mentioned activity criterium may also be any kind of an activity measure. For example, it can be a threshold value wherein instead of searching the first non-zero value as explained above, the search may include finding the first coefficient having a value (or an absolute value if negative values may exist) which exceeds the threshold value. The activity measure could also be, e.g. the total number of non-zero coefficients or the sum of absolute values of the coefficients.

The encoder could, after determining the location of the last non-zero coefficient, encode syntax elements describing the coordinates of that position and output those to a bitstream. A corresponding decoder could then decode those coordinates and start decoding non-zero coefficients for a transform block from that location in the inverse scan order towards the beginning of the scan. In other words, the decoder could decode the last non-zero coefficient and the values of other coefficients of the transform block preceding the last non-zero coefficient.

When the position of the last non-zero coefficient in the transform block has been determined, that position can be used to determine a secondary transform mode. There may be several alternatives how the position affects the secondary transform mode. Some examples will be provided later in this specification.

The determined secondary transform mode can then be used to select a primary transform mode. There may be several alternatives how the secondary transform mode affects the primary transform mode. Some examples will be provided later in this specification.

When the secondary transform mode and the first transform mode have been selected, transform coefficients for the transform block can be determined and a transformation operation based on said transform coefficients, said primary transform mode and said secondary transform mode can be performed.

In a video or image encoder, determining secondary transform mode can be done for example applying different transform candidates to prediction residuals and selecting a transform candidate that minimizes a given cost function. Such cost functions could contain a term that depends on the exact or estimated number of bits required for representing a transform block, transform unit or a coding unit with the candidate; and a term that depends on a measure of the exact or estimated reconstruction error of a block of samples.

In a video or image decoder, determining secondary transform mode can be done by parsing syntax elements indicating the secondary transform mode.

Determining the secondary transform mode can include different availability checks in both encoder and decoder; and signaling and parsing of the secondary transform mode can be omitted under some conditions. For example, it can be defined that the last coefficient in a transform block has to be in a certain range in the scan order to secondary transform signaling to be present in the bitstream. In the case the signaling is omitted, the secondary transform mode can be determined to be for example zero or another indication, which may be used to indicate that the secondary transform is switched off for the transform block, transform unit or coding unit.

Selecting the primary transform mode in a video or image encoder can be done following similar approach to selecting the secondary transform mode, including testing different primary transform modes and evaluating cost functions and selecting the mode minimizing the selected cost function.

In an embodiment, determining the primary transform mode is done based on determined secondary transform mode. This may include, for example, omitting signaling of some or all syntax elements relating to primary transform mode in the case a non-zero secondary transform mode is included in a bitstream. Signaling of the primary transform mode can also be divided in two or mode parts in the bitstream. For example, signaling of a so called transform skip mode where both primary and secondary transforms are by-passed can be done before signaling the position of the last coefficient in a transform block, whereas the signaling of the secondary transform mode can be done after the last coefficient position signaling, followed by signaling of the primary transform in the case the secondary transform is signaled to be off for a transform block.

Determining of the transform coefficients for a transform block can be done in various ways. Those can, for example, be signaled in a specific scan order or inverse scan order using context based arithmetic coding for the values of quantized coefficients. The quantized coefficients signaled in the bitstream can be dequantized and scaled in various ways prior to performing inverse primary and/or secondary transform operations.

Performing the transformation operations can also be done in different ways. The transformation or inverse transformation can be performed for example using matrix multiplication operations, multiply and add operations, or shift and add operations or a combination of those. The transform matrix selection can include, in addition to parsing the secondary transform mode and primary transform mode, for example operations and conditions checking the dimensions of the transform block, luma/chroma channel of the transform block or intra prediction mode associated with the transform block, transform unit, prediction unit or a coding unit.

A primary transform can refer to a transform that is applied to decoded transform coefficients or a set of transform coefficients that are output from a secondary transform in a decoder. A secondary transform can refer to a transform that is applied to decoded transform coefficients and which output is fed as an input to a primary transform. Examples of primary transforms include the discrete cosine transform (DCT) and discrete sine transform (DST) family of transforms that are used for example in the draft VVC standard and signaled using the tu_mts_idx syntax element. The draft VVC standard includes also a secondary transform referred to as a low-frequency non-separable transform or LFNST. Enabling and signaling the LFNST secondary transform mode is done using the lfnst_idx syntax element in a code implemented according to that draft standard.

In an embodiment, the signaling or decoding of primary transform is performed based on the use of secondary transform. The signaling or decoding is made advantageously after the last transform coefficient position is signaled or decoded in a transform block and before the signaling or decoding of coefficients in that transform block. This setting allows a video decoder to determine both the type of primary transform and the type of secondary transform before decoding coefficients in a transform block and skip decoding coefficient areas that are not applicable for the selected primary transform or the selected primary-secondary transform pair.

There may be a number of benefits in performing both primary transform signaling and secondary transform signaling and decoding in transform block level and determining the primary transform mode depending on the knowledge of selected secondary transform mode. Firstly, signaling the secondary transform mode in coding unit level after encoding or decoding a whole coding unit may add latency to implementations. For example, in an encoder the availability criteria of the secondary transform in luma component may only fulfill after encoding also the chroma component of a coding unit. That may complicate the encoder design and may force an encoder to buffer information that may not become relevant. Similarly, in a decoder the luma transform can only be determined after syntax elements for all the chroma transform blocks within the same coding unit have been decoded. Secondly, in a usage approach it may be more efficient coding efficiency wise to represent the secondary transform mode first and be able to omit the signaling for primary transform mode especially in the case usage of secondary transform is restricted to a sub-set of primary transforms.

Different threshold values and ranges of syntax element values may be used in determining if a certain syntax element is present in a bitstream or not. Also other parameters, such as usage of certain intra or inter prediction modes for the coding unit, prediction unit, transform unit or block can be included in the decision to decode or encode a secondary transform or a primary transform mode. As an example, the following syntax structure could be used to represent the bitstream syntax:

```
residual_coding( x0, y0, log2TbWidth, log2TbHeight, cIdx ) {
  ...
  if( lastScanPos > 0 && lastScanPos < 16 &&
     !( lastScanPos > 7 && (log2TbWidth = = 2 | | log2TbWidth = = 3 )
        && log2TbWidth = = log2TbHeight ) )
    lfnstLastPosConditions = true
  else
    lfnstLastPosConditions = false
  if( lfnstGenericConditions && lfnstLastPosConditions ) {
    lfnst_idx[ x0 ][ y0 ]
  }
  if( mtsGenericConditions && lfnst_idx[ x0 ][ y0 ] = = 0 ) {
    mts_idx[ x0 ][ y0 ]
  }
  ...
```

The generic conditions for secondary transform indication lfnstGenericConditions can include, for example, comparing the dimensions of the transform block to threshold values. For example, it can include comparing minimum of the width and height of the transform block to a value of 4 or 2. In addition to generic conditions, the conditions to parse the secondary transform mode lfnst_idx may include checking the last coefficient position in the transform block. An example of that is also given in the syntax table by defining a lfnstLastPosConditions variable that is calculated based on the last scan position lastScanPos for the transform block. These conditions separately or together can be referred to as the secondary transform availability conditions.

Similarly, the condition to decode primary transform mode mts_idx may include generic conditions mtsGenericConditions, such as the minimum or maximum dimension of the transform block. In addition to generic conditions the indicated lfnst_idx may be included in the availability check of the mts_idx syntax element. In the example above, lfnst_idx needs to be equal to zero to enable parsing of the mts_idx.

These conditions separately or together can be referred to as the primary transform indication conditions.

Indication of the secondary transform mode lfnst_idx can be done within one transform block, but the effect of the indication can cover multiple transform blocks. For example, in the case of a single tree coding unit containing both luminance and chrominance transform blocks, lfnst_idx can be determined for the luma transform block using the secondary transform availability conditions for that luma transform block. The indicated lfnst_idx can then be used as the secondary transform mode also for the chroma transform blocks within the same coding unit or transform unit.

In the case of dual-tree coding where luma component is separated into a coding structure of its own and the chroma components to another coding structure, the lfnst_idx for a luma transform block can be determined based on the secondary transform availability conditions for that luma block. When it comes to chroma transform blocks a joint lfnst_idx can be indicated for the two chroma blocks by including the secondary transform availability conditions in the first chroma transform block with non-zero transform coefficients. This can be implemented for example using the following additional condition in the generic secondary transform availability conditions lfnstGenericConditions:

```
residual_coding( x0, y0, log2TbWidth, log2TbHeight, cIdx ) {
...
    lfnstGenericConditions = lfnstGenericConditions && ( cIdx == 0 ||
        ( treeType == DUAL_TREE_CHROMA && (cIdx == 1 ||
        tu_cbf_cb == 0)))
...
```

Where cIdx equal to zero refers to the luma transform block, cIdx equal to one refers to the first chroma transform block, treeType equal to DUAL_TREE_CHROMA refers to dual-tree coding with separate luma and chroma trees and transform block belonging to the chroma tree and tu_cbf_cb equal to zero referring to first chroma transform block having only zero valued coefficients.

Secondary transform mode lfnst_idx and primary transform mode mts_idx can also be indicated in coding unit level. In that case the availability conditions for secondary transform indication may use only the last coefficient position indication lastScanPos of the luma transform block or luma blocks within that coding unit and omit the last coefficient position indications for chroma transform blocks in the case of single tree coding and in the case of dual-tree luma coding. In the case of dual-tree chroma coding the secondary transform availability conditions may include last coefficient position indication lastScanPos for the first chroma transform block with non-zero coefficients.

The order of encoding and decoding different syntax elements may depend on higher level signaling in the bitstream. Such signaling may take place, for example, in different parameter sets or headers in the video bitstream or outside of the bitstream, and may include disabling or enabling all or some of the primary transform modes and secondary transform modes. For example, depending on such signaling the primary transform indicator may be decoded before the last coefficient indicator if secondary transforms have been disabled for all or part of the bitstream; and after the secondary transform indicator if secondary transforms have been enabled for all or part of the bitstream.

FIG. 6 demonstrates a dual transform process according to an approach. Block A illustrates a residual sample block. Block B illustrates a transform coefficient block in primary transform base (after primary transform in encoding direction and before primary transform in decoding direction). Block C illustrates a transform coefficient block in secondary transform base (after secondary transform in encoding direction and before secondary transform in decoding direction). Secondary transform in typically applied to the top-left corner of the transform coefficients, typically corresponding to the low frequency content in the input signal. An area D in block C depicts such double or dual transformed area. Whereas, an area S in block C depicts an area that has underwent a single transform stage. Primary transform and secondary transforms can refer here to either the forward or inverse variants of the transforms depending on the direction of processing.

FIG. 7 illustrates a dual transformation process with an incomplete or a partial secondary transform. In this case the secondary transform, when applied in forward direction, takes the primary transform coefficients in the areas marked with D, $Z_0$ and $Z_1$ and outputs non-zero values in the area of D. When such a secondary transform is applied to the inverse direction, coefficients in the area D are used as the input and inverse secondary transform can output coefficients in all areas D, $Z_0$ and $Z_1$ thus populating the area of the primary transform.

Secondary transforms are used in residual coding e.g. in the JEM exploration model (mode-dependent non-separable secondary transform, MDNSST), disclosed in JVET-G1001, "Algorithm Description of Joint Exploration Test Model 7 (JEM 7)", Turin, IT, July 2017, and in VTM reference implementation of the draft VVC standard (Low Frequency Non-Separable Transform, LFNST), disclosed in JVET-N1001, "Versatile Video Coding (Draft 5)", Geneva, CH, April 2019.

In these cases, the secondary transforms are applied either within the 4×4 or 8×8 low frequency area after the primary transform in the encoder and similarly before the primary transform in the decoder. In both cases, the final set of transform coefficients consists of low frequency coefficients that have been double transformed and high frequency coefficients that have been transformed with a single transform. Such a selection may not be ideal in all scenarios.

The methods and the related embodiments can be implemented in different ways. For example, the order of operations described above can be changed or the operations can be interleaved in different ways. Also, different additional operations can be applied in different stages of the processing. For example, there may be additional filtering, scaling, mapping or other processing applied to the final or intermediate result of described operations. The final or intermediate result of the operations described above may also be further combined with results of other operations.

Figure 11:
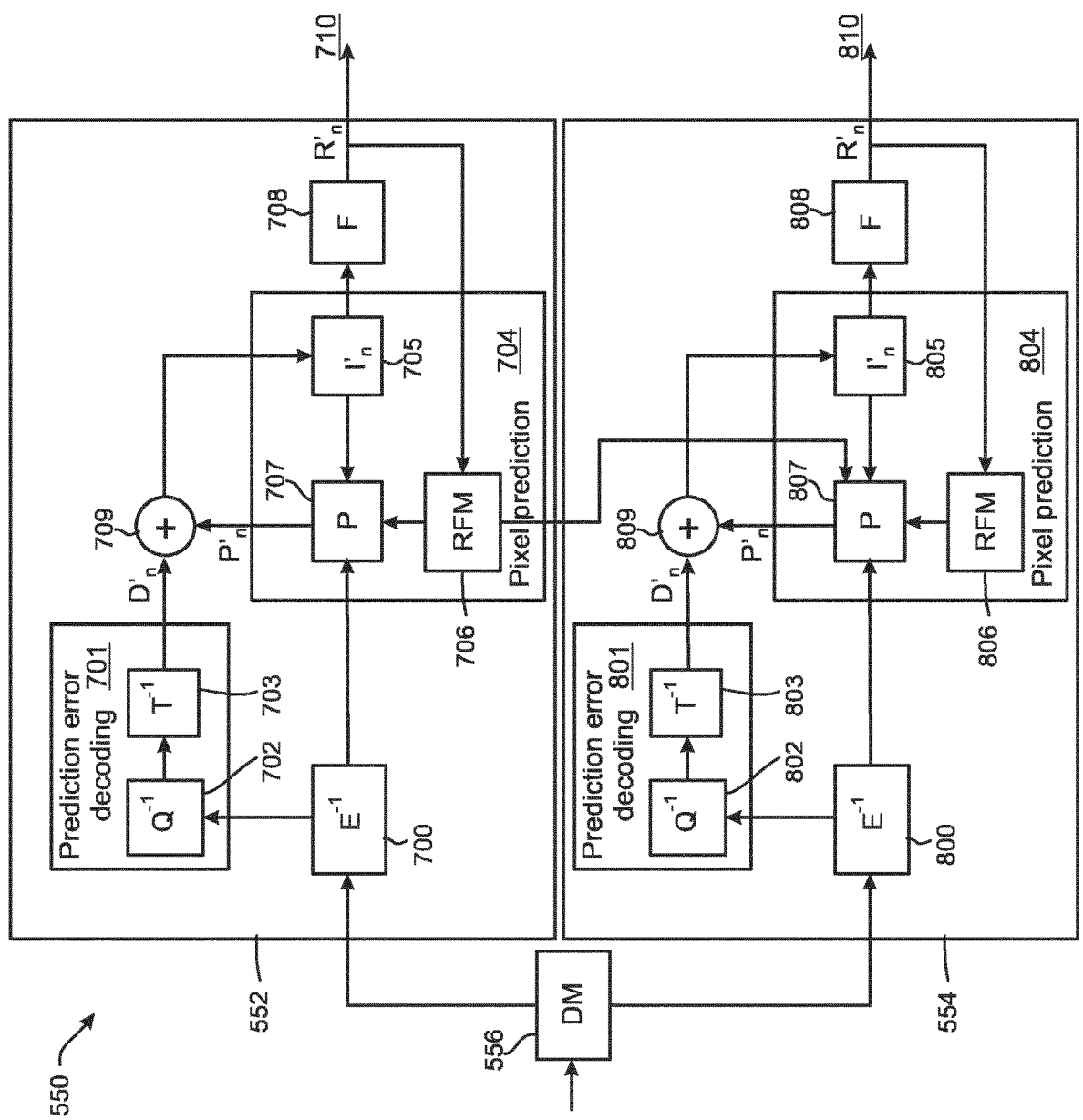
FIG. 11 shows a schematic diagram of a decoder suitable for implementing embodiments of the invention.

FIG. 11 shows a block diagram of a video decoder suitable for employing embodiments of the invention. FIG. 11 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the preliminary reconstructed images (I'n). Preliminary reconstructed and filtered base layer images may be output 709 from the first decoder section 552 and preliminary reconstructed and filtered base layer images may be output 809 from the first decoder section 554.

Herein, the decoder should be interpreted to cover any operational unit capable to carry out the decoding operations, such as a player, a receiver, a gateway, a demultiplexer and/or a decoder.

As a further aspect, there is provided an apparatus comprising: at least one processor and at least one memory, said at least one memory stored with code thereon, which when executed by said at least one processor, causes the apparatus to perform at least: decoding a set of transform coefficients associated with a transform block; determining if a dual transform is applied to said transform block, and if affirmative; performing a first transform to the set of decoded transform coefficients and generate a first set of output values; performing a second transform using said first set of output values as input to said second transform and generate a second set of output values; and using the second set of output values as the output of the dual transform.

Such an apparatus further comprises code, stored in said at least one memory, which when executed by said at least one processor, causes the apparatus to perform one or more of the embodiments disclosed herein.

Figure 12:
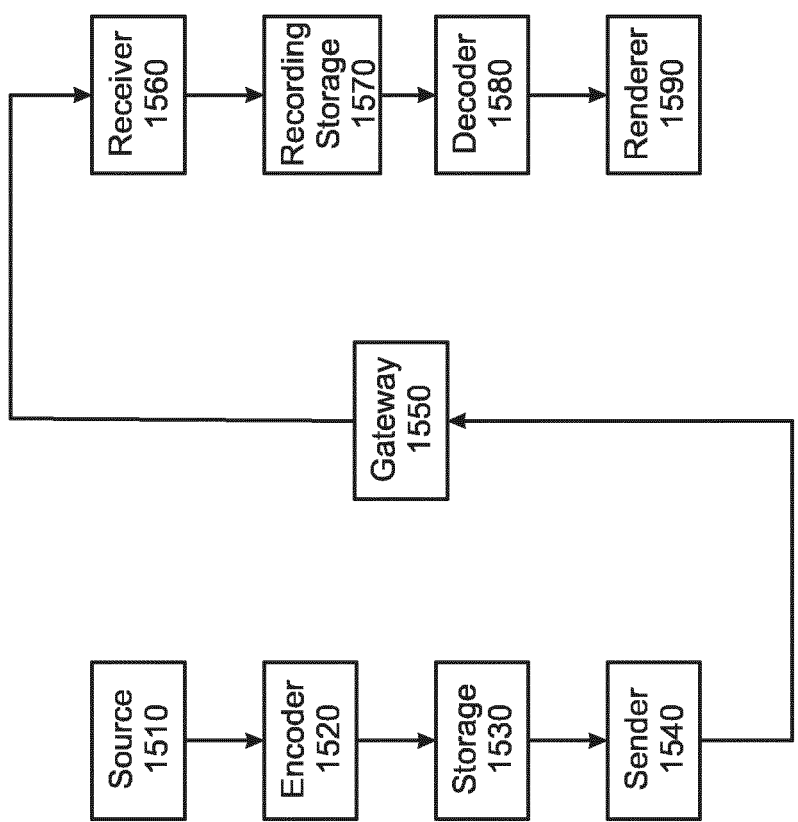
FIG. 12 shows a schematic diagram of an example multimedia communication system within which various embodiments may be implemented.

FIG. 12 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC. It needs to be understood that embodiments may be similarly realized with any video encoder and/or video decoder.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder. For example, some embodiments have been described related to generating a prediction block as part of encoding. Embodiments can be similarly realized by generating a prediction block as part of decoding, with a difference that coding parameters, such as the horizontal offset and the vertical offset, are decoded from the bitstream than determined by the encoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising at least one processor and at least one memory, said at least one memory having code thereon, which when executed by said at least one processor, causes the apparatus to perform at least:
   obtain a block of transform coefficients;
   search a position of a last non-zero coefficient in a scan order in the block of transform coefficients;
   select a secondary transform mode based on the position of the last non-zero coefficient, wherein the secondary transform mode corresponds to a secondary transform;
   encode first syntax elements indicative of the selected secondary transform mode;
   select a primary transform mode based on the selected secondary transform mode, wherein a primary transform corresponds to the primary transform mode;
   encode second syntax elements indicative of the selected primary transform mode;
   encode third syntax elements defining the transform coefficients within the block; and
   sending the first, second, and third syntax elements as part of a bit stream, wherein indication of the primary transform mode is in the bit stream when the secondary transform mode is zero and indication of the primary transform mode is not in the bit stream when the secondary transform mode is non-zero, wherein the primary transform is implemented as a discrete cosine transform (DCT) when the secondary transform is used, and when the secondary transform mode is non-zero, a low-frequency non-separable transform is used as the secondary transform coupled with the DCT being used as the primary transform.

2. The apparatus according to claim 1, wherein said at least one memory has code thereon, which when executed by said at least one processor, causes the apparatus to perform:

encode the first syntax elements indicative of the secondary transform mode based on the position of the last non-zero coefficient being within a certain range in the scan order in the block.

3. The apparatus according to claim 1, wherein the said at least one memory has code thereon, which when executed by said at least one processor, causes the apparatus to select the primary or secondary transform mode at least by performing the following:
test different transform modes;
evaluate cost functions for the tested different transform modes to select a cost function; and
select one of the different transform modes which minimizes the selected cost function.

4. The apparatus according to claim 1, wherein said at least one memory has code thereon, which when executed by said at least one processor, causes the apparatus to perform:
omit signaling of some or all syntax elements relating to the primary transform mode based on a non-zero secondary transform mode being included in a bitstream.

5. The apparatus according to claim 1, wherein said at least one memory has code thereon, which when executed by said at least one processor, causes the apparatus to perform:
signal a transform skip mode based on both primary and secondary transforms being by-passed before signaling position of a last non-zero coefficient in the block of transform coefficients.

6. The apparatus according to claim 1, wherein said at least one memory has code thereon, which when executed by said at least one processor, causes the apparatus to perform:
signal the position of the last non-zero coefficient; and
signal the first syntax elements indicative of the selected secondary transform mode after signaling the position of the last non-zero coefficient.

7. The apparatus according to claim 1, wherein said at least one memory has code thereon, which when executed by said at least one processor, causes the apparatus to perform:
signal the secondary transform to be off for the block of transform coefficients; and
signal the second syntax elements indicative of the selected primary transform mode after signaling the first syntax elements indicative of the selected secondary transform mode.

8. The apparatus according to claim 1, wherein said at least one memory has code thereon, which when executed by said at least one processor, causes the apparatus to perform:
signal syntax elements defining the transform coefficients of the block of transform coefficients after signaling the second syntax elements indicative of the selected primary transform mode.

9. A method comprising obtaining a block of transform coefficients;
searching a position of a last non-zero coefficient in a scan order in the block of transform coefficients;
selecting a secondary transform mode based on the position of the last non-zero coefficient, wherein the secondary transform mode corresponds to a secondary transform, and encoding first syntax elements indicative of the selected secondary transform mode;
selecting the primary transform mode based on the selected secondary transform mode, wherein a primary transform corresponds to the primary transform mode;

encoding second syntax elements indicative of the selected primary transform mode;
encoding third syntax elements defining the transform coefficients within the block; and
sending the first, second, and third syntax elements as part of a bit stream, wherein indication of the primary transform mode is in the bit stream when the secondary transform mode is zero and indication of the primary transform mode is not in the bit stream when the secondary transform mode is non-zero, wherein the primary transform is implemented as a discrete cosine transform (DCT) when the secondary transform is used, and when the secondary transform mode is non-zero, a low-frequency non-separable transform is used as the secondary transform coupled with the DCT being used as the primary transform.

10. The method according to claim 9 further comprising:
encoding the first syntax elements indicative of the secondary transform mode if the position of the last non-zero coefficient is within a certain range in the scan order in the block.

11. The method according to claim 9 further comprising:
omitting signaling of some or all syntax elements relating to the primary transform mode based on a non-zero secondary transform mode being included in a bitstream.

12. The method according to claim 9 further comprising:
signaling a transform skip mode based on both primary and secondary transforms being by-passed before signaling a position of a last non-zero coefficient in the block of transform coefficients.

13. The method according to claim 9 further comprising:
signaling the position of the last non-zero coefficient; and
signaling the first syntax elements indicative of the selected secondary transform mode after signaling the position of the last non-zero coefficient.

14. An apparatus comprising:
at least one processor and at least one memory, said at least one memory having code thereon, which when executed by said at least one processor, causes the apparatus to perform at least:
receive a bit stream comprising encoded information related to a block of transform coefficients;
decode from the bit stream an indication of a position of a last non-zero coefficient in a scan order in the block of transform coefficients;
use the position of the last non-zero coefficient to determine when an indication of a secondary transform mode is present in the bit stream;
determine an indication of a secondary transform mode is present in the bit stream, and determine the secondary transform mode by decoding first syntax elements indicative of the secondary transform mode;
use the determined secondary transform mode to determine when an indication of a primary transform mode is present in the bit stream, wherein indication of the primary transform mode is in the bit stream when the secondary transform mode is zero and indication of the primary transform mode is not in the bit stream when the secondary transform mode is non-zero;
determine the primary transform mode by decoding second syntax elements indicative of the primary transform mode when the indication of the primary transform mode is in the bit stream;
decode the transform coefficients;
apply the determined primary and secondary transform modes to select corresponding primary and secondary transforms, wherein the primary transform is based on the secondary transform; and apply the determined primary and secondary transforms to the transform coefficients, wherein indication of the primary transform mode is in the bit stream when the secondary transform mode is zero and indication of the primary transform mode is not in the bit stream when the secondary transform mode is non-zero, the secondary transform is implemented as a low-frequency non-separable transform, and the primary transform is implemented as a discrete cosine transform (DCT) when the secondary transform mode is non-zero.

15. The apparatus according to claim 14, said at least one memory has code thereon, which when executed by said at least one processor, causes the apparatus to:
   omit decoding coefficient areas that are not applicable for the determined primary transform or a determined primary-secondary transform pair.

16. The apparatus according to claim 14, said at least one memory has code thereon, which when executed by said at least one processor, causes the apparatus to:
   apply at least one of the primary transform and the secondary transform to one or more transform blocks following the transform block which included indication indicative of the at least one of the primary transform mode and the secondary transform mode.

17. The apparatus according to claim 14, said at least one memory has code thereon, which when executed by said at least one processor, causes the apparatus to:
   decode from the bit stream the indication of the primary transform mode based on a predetermined condition being fulfilled.

18. The apparatus according to claim 17, wherein said predetermined condition includes one of:
   a minimum dimension of the block of transform coefficients; or
   a maximum dimension of the block of transform coefficients.

19. A method comprising:
   receiving a bit stream comprising encoded information related to a block of transform coefficients;
   decoding from the bit stream an indication of a position of a last non-zero coefficient in a scan order in the block of transform coefficients;
   using the position of the last non-zero coefficient to determine when an indication of a secondary transform mode is present in the bit stream;
   determining an indication of a secondary transform mode is present in the bit stream, and determining the secondary transform mode by decoding first syntax elements indicative of the secondary transform mode;
   using the determined secondary transform mode to determine when an indication of a primary transform mode is present in the bit stream, wherein indication of the primary transform mode is in the bit stream when the secondary transform mode is zero and indication of the primary transform mode is not in the bit stream when the secondary transform mode is non-zero;
   determining the primary transform mode by decoding second syntax elements indicative of the primary transform mode, when the indication of the primary transform mode is present in the bit stream;
   decoding the transform coefficients;
   applying the determined primary and secondary transform modes to select corresponding primary and secondary transforms, wherein the primary transform is based on the secondary transform; and
   apply the determined primary and secondary transforms to the transform coefficients, wherein indication of the primary transform mode is in the bit stream when the secondary transform mode is zero and indication of the primary transform mode is not in the bit stream when the secondary transform mode is non-zero, wherein the secondary transform is implemented as a low-frequency non-separable transform. and the primary transform is implemented as a discrete cosine transform (DCT) when the secondary transform mode is non-zero.

20. The method according to claim 19, comprising:
   omitting decoding coefficient areas that are not applicable for the determined primary transform or a determined primary-secondary transform pair.

* * * * *